United States Patent [19]

Masai

[11] 4,380,279

[45] Apr. 19, 1983

[54] VISCOUS FLUID COUPLING DEVICE

[75] Inventor: Hiroto Masai, Toyota, Japan

[73] Assignee: Aisin Seiki Kabushiki Kaisha, Kariya, Japan

[21] Appl. No.: 213,024

[22] Filed: Dec. 4, 1980

[30] Foreign Application Priority Data

Dec. 26, 1979 [JP] Japan ............................. 54-180878[U]

[51] Int. Cl.³ ........................ F16D 35/00; F16D 43/25
[52] U.S. Cl. ................................ 192/58 B; 192/82 T; 236/101 D; 251/11
[58] Field of Search ......................... 192/58 B, 82 T; 73/363.9; 236/101 D, 101 C

[56] References Cited

U.S. PATENT DOCUMENTS

| | | | |
|---|---|---|---|
| 2,609,690 | 9/1952 | Osborne et al. | 73/363.9 |
| 3,227,254 | 1/1966 | Sutaruk | 192/82 T |
| 4,054,193 | 10/1977 | Streeter | 192/82 T X |
| 4,103,765 | 8/1978 | Tinholt | 192/82 T |
| 4,185,726 | 1/1980 | Rohrer | 192/82 T X |
| 4,190,140 | 2/1980 | Konkle et al. | 192/82 T |
| 4,278,160 | 7/1981 | Hayashi | 192/82 T |

Primary Examiner—Allan D. Herrmann
Attorney, Agent, or Firm—Oblon, Fisher, Spivak, McClelland & Maier

[57] ABSTRACT

A viscous fluid coupling including a drive shaft drivably connected to the engine, a casing member rotatably mounted on the drive shaft and provided with a fluid working chamber and a fluid reservoir, a rotor fixed to the drive shaft and located in the fluid working chamber and rotatable relative to the casing member, a valve shaft rotatably and sealingly mounted on the casing member, a valve plate fixed to an inner end of the valve shaft and operable to control fluid communication between the fluid working chamber and the reservoir, a helically wound bimetal element located on an exterior portion of the casing member, the bimetal element having an inner end portion connected to an outer end of the valve shaft and an outer end portion being connected to a suitable portion of the casing member, and a resilient member located between the outer end portion and the casing member.

3 Claims, 4 Drawing Figures

VISCOUS FLUID COUPLING DEVICE

BACKGROUND OF THE INVENTION

1. Field of Invention

The present invention relates to a viscous fluid coupling device of the type including temperature responsive bimetal elements, and more particularly, to an elastic mounting arrangement for the free end of the bimetal element.

2. Description of the Prior Art

Viscous fluid coupling devices of the type to which the present invention relates are now well known in the art and may be better understood by reference to U.S. Pat. No. 3,227,254.

Although the present invention may be useful with many types and configurations of temperature responsive fluid couplings, it is especially advantageous on those to be used with vehicle radiator cooling fans, and will be described in connection therewith.

A typical fluid coupling device includes an output coupling member and a cover member cooperating to define a fluid chamber. The device includes a valve plate disposed to separate the fluid chamber into a reservoir and an operating chamber. An input coupling member is rotatably disposed within the operating chamber and the device includes valve means operable to control the flow of fluid between the reservoir and the operating chamber. The valve means includes a valve shaft extending outwardly through the cover means and being rotatable relative thereto. The rotational position of the valve shaft and the valve is controlled by a temperature responsive bimetal element having a first end portion connected to the valve shaft and a second end portion fixed relative to the cover means.

A problem which has arisen in connection with the use of viscous fluid couplings on four-cylinder engines relates to the greater vibration inherent in four-cylinder engines. The engine vibration is transmitted to the fluid coupling and typically, the result is excessive wear between the bimetal element and the shaft and between the bimetal element and its mounting bracket. If excessive wear occurs at either of these locations, there may be a substantial change in the temperature at which the coupling engages and/or disengages, causing unsatisfactory operation of the device.

If the wear becomes extreme, especially between the bimetal coil and the shaft, the coil may become completely detached from the device, with the result that the device will no longer be temperature responsive, but will remain either engaged or disengaged, whichever was the condition of the device at the time that the coil become detached.

A resilient supporting arrangement of the free end of the coil is found, for instance, in the U.S. Pat. No. 4,103,765 wherein the free end of the coil is resiliently retained to the clip by means of the resilient material. This resilient material is associated with the bimetal to retain the free end at a given position relative to the slot in the clip and resiliently restricts radial movement of the free end from the give portion. Such a conventional resilient supporting arrangement is complicated in structure. In addition, a die has to be used to form the resilient material.

SUMMARY OF THE INVENTION

It is therefore a principal object of the present invention to provide a temperature responsive viscous fluid coupling device in which the free end of the bimetal element is mounted elasticaly by a retainer so that the resonance of the bimetal element is positively damped by the retainer.

It is another object of the present invention to provide a temperature responsive viscous fluid coupling device including a simple and inexpensive retaining arrangement which achieves the above-stated object without inducing substantial hysteresis while increasing the coefficient of friction between the retainer and the bimetal element.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
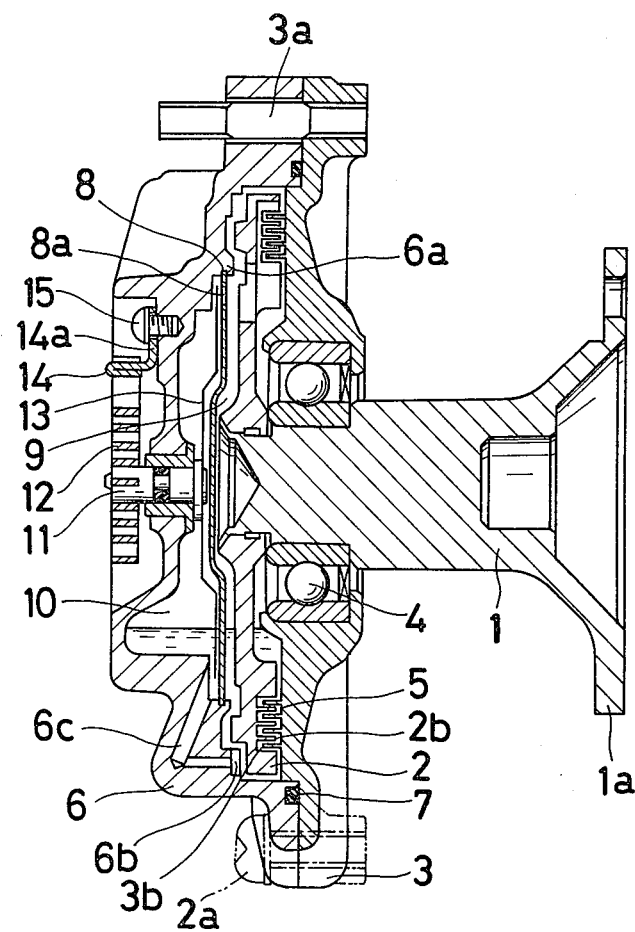
FIG. 1 is an axial cross section of a viscous fluid coupling device of the type which may utilize the present invention.
Figure 2:
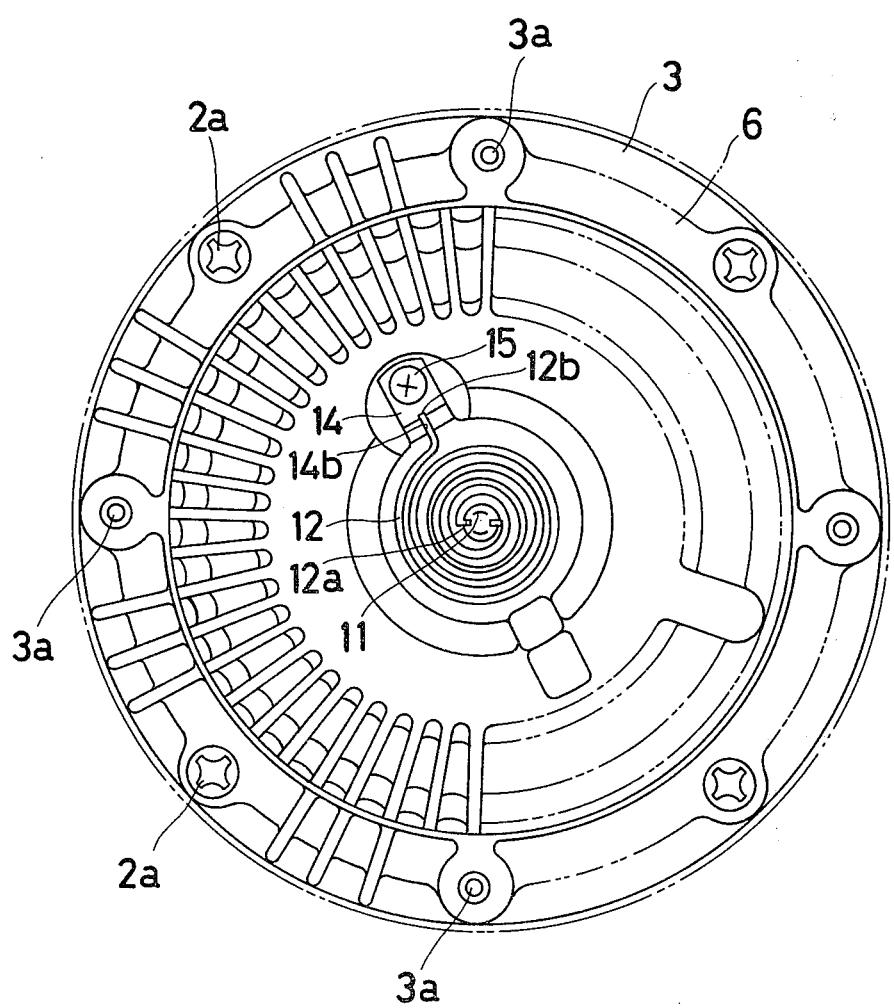
FIG. 2 is a front side elevation view of the device of FIG. 1.

Referring now to FIGS. 1 and 2, there is illustrated a preferred form of a viscous fluid coupling device of the present invention. The viscous fluid coupling device includes a drive shaft 1 having a rotor 2 fixed thereon and a casing member formed by a case 3 and a cover 6. The coupling device of the subject embodiment may be used as a drive for an automotive engine accessory, and specifically, as a drive for a radiator cooling fan. The fan (not shown) may be fixed to the casing member by means of a plurality of stud-bolts 3a threaded to the case 3.

The drive shaft 1 is rotatably driven at a flange portion 1a which may be bolted to the flange of the power source for example, to the water pump (not shown). The drive shaft 1 functions as a support for the inner race of a bearing 4 which is seated on the inside diameter of the case 3.

The rotor 2 located within the cavity formed between the case 3 and the cover 6. The cover 6 is suitably secured to the case 3 by screws 2a extending through the periphery of the cover 6 and into threaded openings in case 3. A suitable sealing means 7 is provided between the cover 6 and the case 3 to prevent fluid leakage therebetween.

Projections 2b and 3b alternately extended from rotor 2 and case 3 provide a shear space 5 therebetween and a fluid shear medium positioned in the shear space 5 transmits torque between the rotor 2 and case 3.

The cavity formed by the case 3 and cover 6 is divided by a partition plate 8 supported by the cover 6 into a fluid working chamber 9 and a fluid reservoir 10. The partition plate 8 is held in place on the cover 6 by pinning over the shoulder of the cover 6 as shown at 6a in the drawings. A fluid passageway 8a formed in the partition plate 8 fluidically connects the working chamber 9 with the reservoir 10 so that the fluid in the reservoir 10 may flow into the working chamber 9 through the fluid passageway 8a. Control of the variation in flow of the viscous fluid in the working chamber 9 is effected by controlling the fluid flow through the fluid passageway 8a by means of a valve plate 13 located in the reservoir 10. The valve plate 13 is fixed to an inner end of a valve shaft 11 which is rotatably and sealingly mounted on the cover 6. The cover 6 is provided with a pump projection 6b and a discharge passage 6c. The pump projection 6b acts to pump the viscous fluid from the working chamber 9 into the reservoir 10 through the discharge passage 6c upon rotation of the coupling device.

A helically wound bimetal element 12 is located on an exterior portion of the casing member. The bimetal element 12 is provided with an in-turned end portion 12a which is received in a transverse slot disposed in outer end of the valve shaft 11. An out-turned free end portion 12b is received by a slot 14b formed on a resilient retainer 14 mounted on the cover 6 by means of a screw 15 at a leg portion 14a thereof. The retainer 14 is made of resilient metal, such as leafed spring steel, wherein the flexural rigidity of the retainer 14 is smaller than the flexural rigidity of the bimetal element 12. The bimetal element 12 is movable to define a position of the valve plate 13 relative to the partition plate 8 in response to the temperature of air flowing through the radiator (not shown). Therefore, an open or shut condition of the fluid passageway 8a is controlled by the valve plate 13, thereby varying the volume of the viscous fluid in the working chamber 9.

A typical operation of the coupling device with the construction described herein above is set forth as follows. As is well known to the shear type viscous fluid coupling device, the amount of torque transmitted from the rotor 2 to the case 3 is a function of the volume of fluid in the working chamber 9 and the shear space 5. In the event fluid is not located in any of the chamber 9 and the space 5 no torque is transmitted between the rotor 2 and the case 3. On the other hand, when fluid fills or partly fills the shear space 5, torque is transmitted therebetween.

The initial position of the valve plate 13 with respect to the fluid passageway 8a is determined by the ambient temperature. When the temperature of air flowing through the radiator is lower than the predetermined value, the valve plate 13 blocks up the fluid passageway 8a, thus preventing the flow of fluid from the reservoir 10 to the working chamber 9. Since the discharge passage 6c is always in communication with the working chamber 9 and the reservoir 10, the pump projection 6b rotates relative to rotor 2 thus creating a positive pressure ahead of the pump 6b and positively pumping from the working chamber 9 to the reservoir 10. This results in substantial evacuation of the working chamber 9 and low r.p.m. of the fan with respect to the speed of the rotor 2. As the temperature of air flowing through the radiator is higher than the predetermined value, valve plate 13 is rotated due to the action of the bimetal element 12 and unblocks the fluid passageway 8a. When the fluid passageway 8a is opened, viscous fluid is centrifuged from the reservoir 10 to the working chamber 9 through the fluid passageway 8a. Accordingly, the quantity of viscous fluid in the working chamber 9 is increased, so that torque transmitted to the rotor 2 and the cover 3 is increased.

The case 3 and cover 6 directly receive the vibration of the engine through the drive shaft 1. In the event fluid is not located in any of the chamber 9 and the shear space 5, these vibration-receiving phenomena would notably occur. However, vibration of the bimetal element 12 is damped by the retainer 14.

Figure 3:
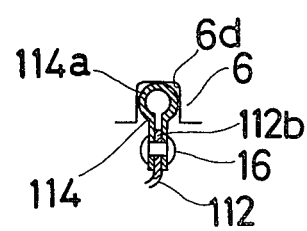
FIG. 3 is a segmentary view of another embodiment of the invention.

FIG. 3 segmentally illustrates another embodiment of the invention wherein similar parts are numbered similar to those in FIGS. 1 and 2 but preceded by 100. A hair-pin shaped resilient member 114 is fixed to an out-turned free end portion 112b of a helically wound bimetal element 112 by means of a rivet 16. The resilient member 114 is located in a suitable insert depression 6d formed on the cover 6 at a round head 114a thereof. The hair-pin shaped resilient member 114 is made of leaf spring steel, wherein a rigidity of the resilient member 114 is smaller than a rigidity of the bimetal element 112.

Figure 4:
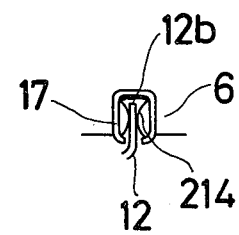
FIG. 4 is a segmentary view of a further embodiment of the invention.

FIG. 4 segmentally illustrates a further embodiment of the invention wherein similar parts are numbered similar to those in FIGS. 1 and 2 but preceded by 200. A hair-pin shaped resilient member 214 is located in a receiving box 17 provided on a suitable portion of the cover 6 and includes first and second projecting sides. The out-turned free end portion 12b of a helically wound bimetal element 12 is held between the sides of resilient member 214 which is made of leafed spring steel having a smaller rigidity than the bimetal element 12.

Obviously, many modifications and variations of the present invention are possible in light of the above teachings. It is therefore to be understood that within the scope of the appended claims the invention may be practiced otherwise than as specifically described herein.

What is claimed is:

1. A viscous fluid coupling comprising:
 a drive member;
 a casing member rotatably mounted on said drive member and provided with a fluid working chamber and a fluid reservoir wherein said casing member has an insert depression formed therein;
 a rotor fixed to said drive member and located in said fluid working chamber and rotatable relative to said casing member;
 a shaft rotatably and sealingly mounted on said casing member;
 a valve plate fixed to an inner end of said shaft and operable to control fluid communication between said fluid working chamber and said reservoir;
 a helically wound bimetal element located on an exterior portion of said casing member, said bimetal element having an inner end portion connected to an outer end of said shaft and an outer end portion of said bimetal element being connected to a portion of said casing member; and
 a resilient member having a rigidity less than the rigidity of said bimetal element and made of leaf spring steel and located between said outer end portion of said bimetal element and said casing member, wherein said resilient member further comprises a hair-pin shaped member having a round head and being fixed to said outer end portion by means of a rivet and located in said insert depression formed on the casing at said round head of said resilient member.

2. A viscous fluid coupling comprising:

a drive member;

a casing member rotatably mounted on said drive member and provided with a fluid working chamber and a fluid reservoir;

a receiving box provided on said casing member;

a rotor fixed to said drive member and located in said fluid working chamber and rotatable relative to said casing member;

a shaft rotatably and sealingly mounted on said casing member;

a valve plate fixed to an inner end of said shaft and operable to control fluid communication between said fluid working chamber and said reservoir;

a helically wound bimetal element located on an exterior portion of said casing member, said bimetal element having an inner end portion connected to an outer end of said shaft and an outer end portion of said bimetal element being connected to said casing member; and a resilient member having a rigidity less than the rigidity of said bimetal element and made of leaf spring steel and located between said outer end portion of said bimetal element and said casing member, wherein said resilient member is located in said receiving box provided on said casing member and said outer end portion of said bimetal element is held between sides of said resilient member.

3. A viscous fluid coupling comprising:

a drive member;

a casing member rotatably mounted on said drive member and provided with a fluid working chamber and a fluid reservoir;

a receiving box provided on said casing member;

a rotor fixed to said drive member and located in said fluid working chamber and rotatable relative to said casing member;

a shaft rotatably and sealingly mounted on said casing member and having an outer end;

a valve plate fixed to an inner end of said shaft and operable to control fluid communication between said fluid working chamber and said reservoir;

a helically wound bimetal element located on an exterior portion of said casing member and having an inner and an outer end portion, said bimetal element having said inner end portion connected to said outer end of said shaft and said outer end portion of said bimetal element being connected to said casing member; and a resilient member having a rigidity less than the rigidity of said bimetal element and made of leaf spring steel and located between said outer end portion of said bimetal element and said casing member, wherein said resilient member is hair-pin shaped and is located in said receiving box provided on a portion of said casing member and said outer end portion of said bimetal element is held between projecting sides of said resilient member.

* * * * *

UNITED STATES PATENT AND TRADEMARK OFFICE
CERTIFICATE OF CORRECTION

PATENT NO.  : 4,380,279
DATED       : April 19, 1983
INVENTOR(S) : HIROTO MASAI

It is certified that error appears in the above—identified patent and that said Letters Patent is hereby corrected as shown below:

In column 2, line 6, delete "elasticaly" and insert therefor --elastically--;

In column 3, line 26, delete "leafed" and insert therefor --leaf--.

Signed and Sealed this

Twentieth Day of September 1983

[SEAL]

Attest:

Attesting Officer

GERALD J. MOSSINGHOFF

Commissioner of Patents and Trademarks